(12) United States Patent
Papadopoulos

(10) Patent No.: US 6,224,997 B1
(45) Date of Patent: May 1, 2001

(54) DOWNHOLE BATTERY CASE

(76) Inventor: Nick Papadopoulos, 3816-93 Street, Edmonton, AB (CA), T6E 5K6

( * ) Notice: Subject to any disclaimer, the term of this patent is extended or adjusted under 35 U.S.C. 154(b) by 0 days.

(21) Appl. No.: 09/288,228

(22) Filed: Apr. 8, 1999

(51) Int. Cl.⁷ .............................. H01M 2/10; H01M 6/44; H01M 2/02
(52) U.S. Cl. ........................ 429/99; 429/157; 429/159; 429/177; 429/178
(58) Field of Search .................................... 429/173, 157, 429/159, 99, 178

(56) References Cited

U.S. PATENT DOCUMENTS

| | | | |
|---|---|---|---|
| 3,887,394 | * 6/1975 | Kaye | 429/99 |
| 4,123,598 | * 10/1978 | Hammel | 429/159 |
| 4,190,702 | * 2/1980 | Pun et al. | 429/157 X |
| 4,265,984 | * 5/1981 | Kaye . | |
| 4,675,259 | 6/1987 | Totty | 429/157 |
| 4,970,073 | 11/1990 | Arzur | 429/152 |
| 5,122,427 | * 6/1992 | Flowers et al. | 429/99 X |
| 5,296,314 | 3/1994 | Millauer et al. | 429/99 |
| 5,392,856 | 2/1995 | Broussard | 166/285 |
| 5,516,603 | 5/1996 | Holcombe | 429/127 |
| 5,736,271 | 4/1998 | Cisar | 429/96 |
| 5,763,118 | 6/1998 | Stafford | 429/163 |
| 5,866,276 | * 2/1999 | Ogami et al. | 429/159 X |

* cited by examiner

Primary Examiner—John S. Maples
(74) Attorney, Agent, or Firm—Edward H. Oldham

(57) ABSTRACT

Described herein is a flexible battery pack for powering downhole electronic equipment. The pack includes a plurality of electrochemical cells connected and tied together in a stacked working relationship by a pair of semi cylindraceous encapsulating shells which form a primary containment for the electrochemical cells. The shells are secured at each end to a cylindrical insulating plug which secures the shells together. The shells preferably comprise a glass fiber reinforced plastic material. The primary containment is then sealed in a stainless steel tube which is provided to hold the interior components in place during operation. The encapsulating members are provided with an internal grooved recess which receives and holds any electrical conductors which may be required for operation of the battery pack.

10 Claims, 3 Drawing Sheets

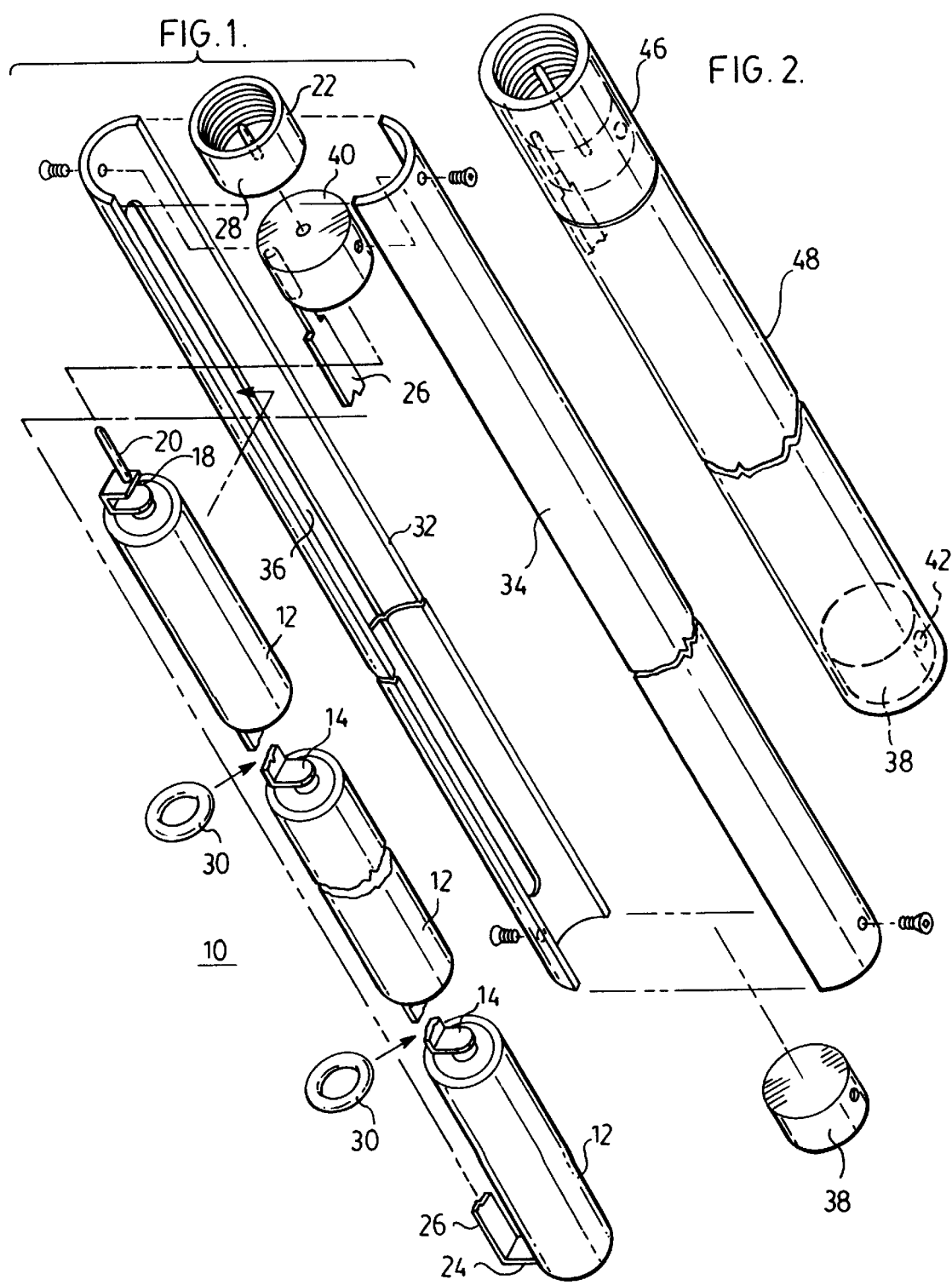

FIG. 3.
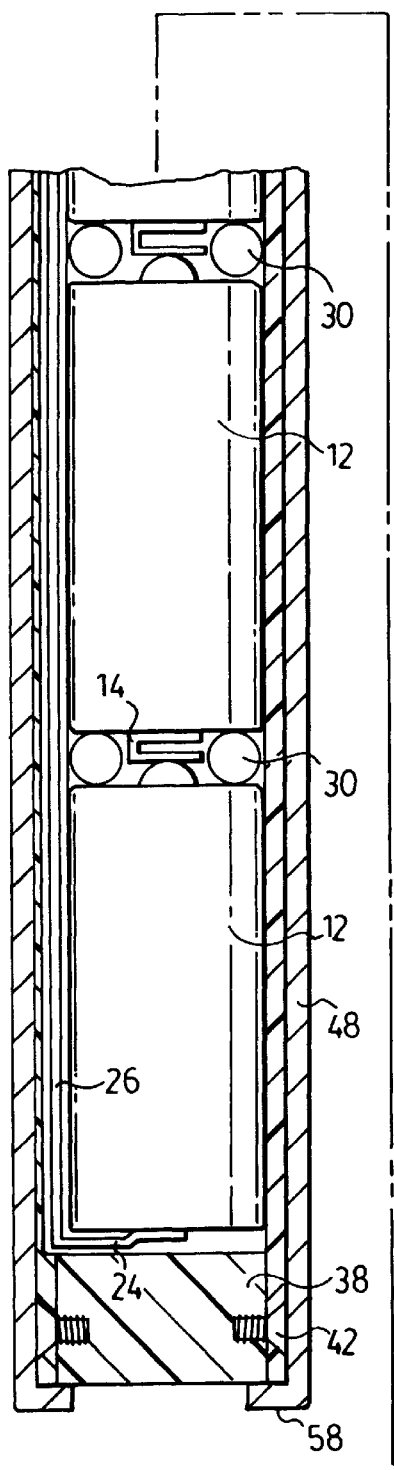
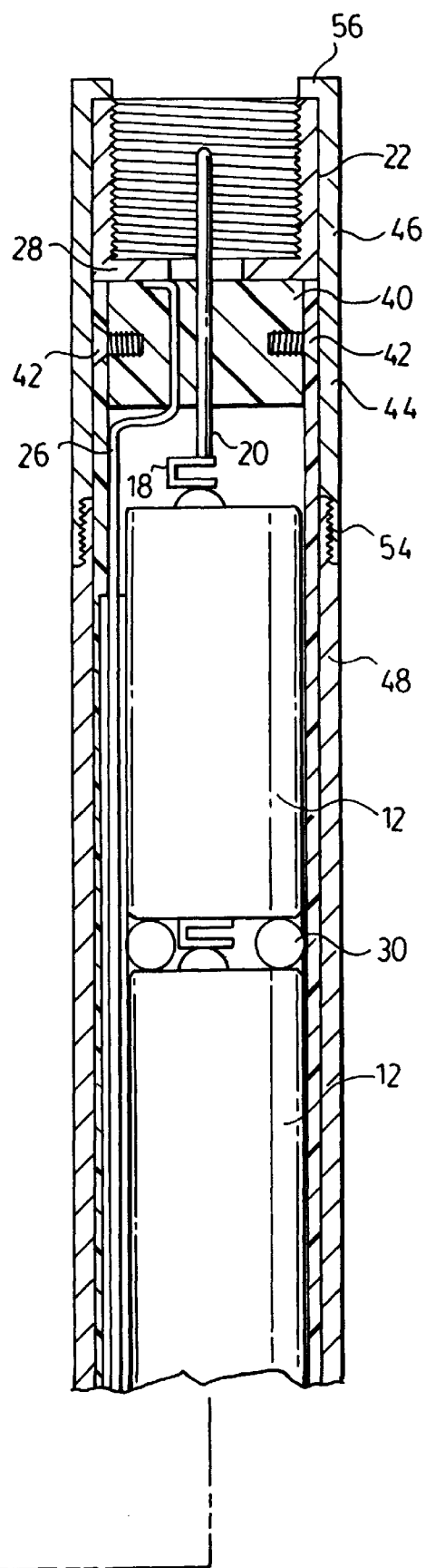

DOWNHOLE BATTERY CASE

FIELD OF INVENTION

In order to gather information relating to the conditions existing at some depth below the surface of an oil or gas well, the well operator frequently lowers electronic sensing equipment into the well which by its nature requires an electrical energy source (battery pack) to provide the energy for sensing, recording and the remote transmission of the various parameters being measured at the location of equipment in the well. The battery pack must be of a particular size and configuration to be accommodated by the drilling or servicing apparatus. Typically, such battery packs have been in the shape of elongated cylinders having electrical terminals at one or both ends of the battery pack for connection to the electronic equipment. The battery pack must operate in conditions which could be best described as being extremely hostile. Wide variations in temperature and pressure of the medium surrounding the battery pack can be expected. At times, the battery pack must withstand severe vibrations which can cause the premature failure of the battery pack by rupture etc. with the consequent loss of the capability to monitor and transmit the well parameters being sensed. It is an expensive and time consuming operation to retrieve the electronic monitoring equipment just to replace a failed battery pack.

BACKGROUND OF THE INVENTION

Oil and gas well drilling and servicing equipment, in the past, has made successful use of elongated cylindrically shaped battery packs which may be used with well tools to provide the power necessary for the operation of the downhole equipment.

Prior art battery packs may contain a plurality of cylindrically shaped energy cells which are physically arranged in an end to end relationship and are individually wired to suit the energy requirements of the equipment with which the battery pack is being used. Usually, the energy cells are connected by insulated conductive straps which are connected to each cell by welding or soldering and the individual cells are connected to a pair of bus conductors extending down the side of the battery pack. These connecting straps are usually insulated from the string of energy cells except where connections are being made. The energy cells and the strap connections are usually encased in some kind of tubular enclosure, such as paper or similar substance, in which the internal diameter of the enclosure is slightly greater than the diameter of the string of connected energy cells and the thickness of the bus connecting straps which pass along the side of the energy cells. The tubular enclosure is provided with a coating of an impervious material such as plastic and a sealed terminal structure is formed at one or both ends of the tubular enclosure.

Failure of prior art battery packs in the hostile environment in which they are forced to operate is usually due to fracture and leakage of the tubular enclosure securing the individual cells together. At times, the vibration in the medium surrounding the battery pack may cause the abrasion and fracture of the flat strap type bus conductors which connect the individual cells together, leading to open circuiting of the bus conductors and in some instances, short circuiting of the bus conductors and the resultant premature discharge of the battery pack. At times the failure of the bus conductors can produce an arc which may cause the battery pack to explode.

Although every attempt is made to seal the prior art battery packs against leakage of the surrounding medium into the interior thereof, when severe operating conditions are encountered, some of the corrosive components (i.e. hydrogen sulfide) of the surrounding medium may penetrate into the interior of the battery pack causing components of the battery pack not only to fail prematurely but also to corrode and swell so that removal of such a failed battery pack from its housing is often difficult if not impossible to do.

SUMMARY OF THE INVENTION

This invention seeks to provide a self contained somewhat flexible battery pack for downhole equipment which is robust and resistant to failure in the modes of the prior art battery packs previously described.

The battery pack of this invention is composed of individual cells which may be interconnected by insulated strap type conductors which are welded in a predetermined manner to the positive and negative surfaces of the individual cells of the battery pack to produce the desired output potential. A set of bus conductors extend up the side of the individual cells and are connected into an external terminal structure of the battery pack (usually at the top).

The individual cells, so connected, are encased in a pair of half cylindrical (clam shell) containment members which are assembled to fit together to hold the individual cells in the cavity formed in the interior thereof as well as any bus type strap connectors which are required to connect the interconnected cells to the terminals of the battery pack. Damage to the battery pack caused by vibration and other shocks is largely eliminated. The clam shells are preferably formed from a suitable plastic material or reinforced high impact plastic material such as a glass fiber reinforced polymeric material which is capable of securing the individual cells firmly in place in their predetermined locations in the stack of cells forming the battery pack. One or both of the shells is provided with a longitudinal grooved recess formed in the interior surface of the half shell extending the length of the clam shell. This recess provides space and support for the necessary connecting bus conductors (wires or straps) for the individual cells and at the same time prevents the direct application of external pressure and vibrating forces to the conductors which over a period of time can lead to failure of the conductor by abrasion and fracture.

The clam shells are provided with a pair of end plugs which are secured to the half shells in any desired manner and one or both of the end plugs may be fitted with end terminals which are connected to the bus connectors of the battery pack to energize downhole equipment.

The two clam shells containing individual energy cells, bus conductors and end terminal structure is now inserted and sealed into an outer metallic jacket (in the form of a tube) so as to inhibit the ingress of foreign material into the battery pack to complete the assembly process.

PERTINENT PRIOR ART

U.S. Pat. No. 4,675,259 Jun. 23. 1989

This patent describes a downhole battery package comprising a linear array of interconnected battery cells in a tubular case. The tubular case is preferably composed of a paper or Nomex paper. No provision is made for the protection or stowage of the electrical lead conductors such as conductive paths shown as 14 and 16 in the battery package. This battery pack is not robust; the entire case may fracture if severe bending of the battery pack is experienced. Even if this battery package does not rupture during use, it is subject to leakage of the surrounding medium into the interior of the battery pack because of its fragile nature.

U.S. Pat. No. 4,970,073

This patent describes a battery pack composed of serially connected cells which are enclosed in reinforcing members which are typically glass fiber sleeves surrounded by binding tape. Standard insulated wire conductors serve to connect terminals of the terminals of the battery pack to the serially connected cells. The interconnected cells and the conductors are inserted into a metal or epoxy tube where a thermosetting encapsulating compound is introduced. The resulting battery pack is a very rugged piece of equipment which is very strong physically and is very resistant to bending. The encapsulating material used in the manufacture of this battery pack takes up precious volume which in most battery packs would be put to better use by increasing the size of the cells used to power the battery pack. The rugged construction of this battery pack renders it incapable of undergoing distortion such as bending, thus, the above battery pack is entirely unsuitable for the downhole application to which applicant's invention is suited.

U.S. Pat. No. 5,516,603 May 14, 1996

This patent describes a flexible battery pack which is used in downhole electronic equipment. Several battery staves (containing serially connected cells) are attached to flexible printed circuits to provide power to downhole apparatus. Little description is given to the encapsulation of the serially connected cells and thus is believed to be not pertinent to applicant's invention.

U.S. Pat. No. 5,392,856 Feb. 28, 1992

This patent describes a setting tool which includes a downhole battery pack. The battery pack comprises a plurality of serially connected cells which are housed in a steel tube which is provided with a fiberglass, phenolic, or ceramic tube type liner. The cell stack is mounted between spring terminals and the steel casing serves as a return lead for the battery pack. This is a very rugged battery pack enclosure which is not easily adapted for applicant's downhole application because of its complete lack of flexibility.

BRIEF DESCRIPTION OF THE DRAWINGS

FIG. 1 is an exploded perspective view of the battery pack of this invention.

FIG. 2 is a sectional elevational view of the battery pack of FIG. 1.

FIG. 3 is a partial sectional view of the battery pack of FIG. 1.

DESCRIPTION OF THE PREFERRED EMBODIMENT

Figure 4:
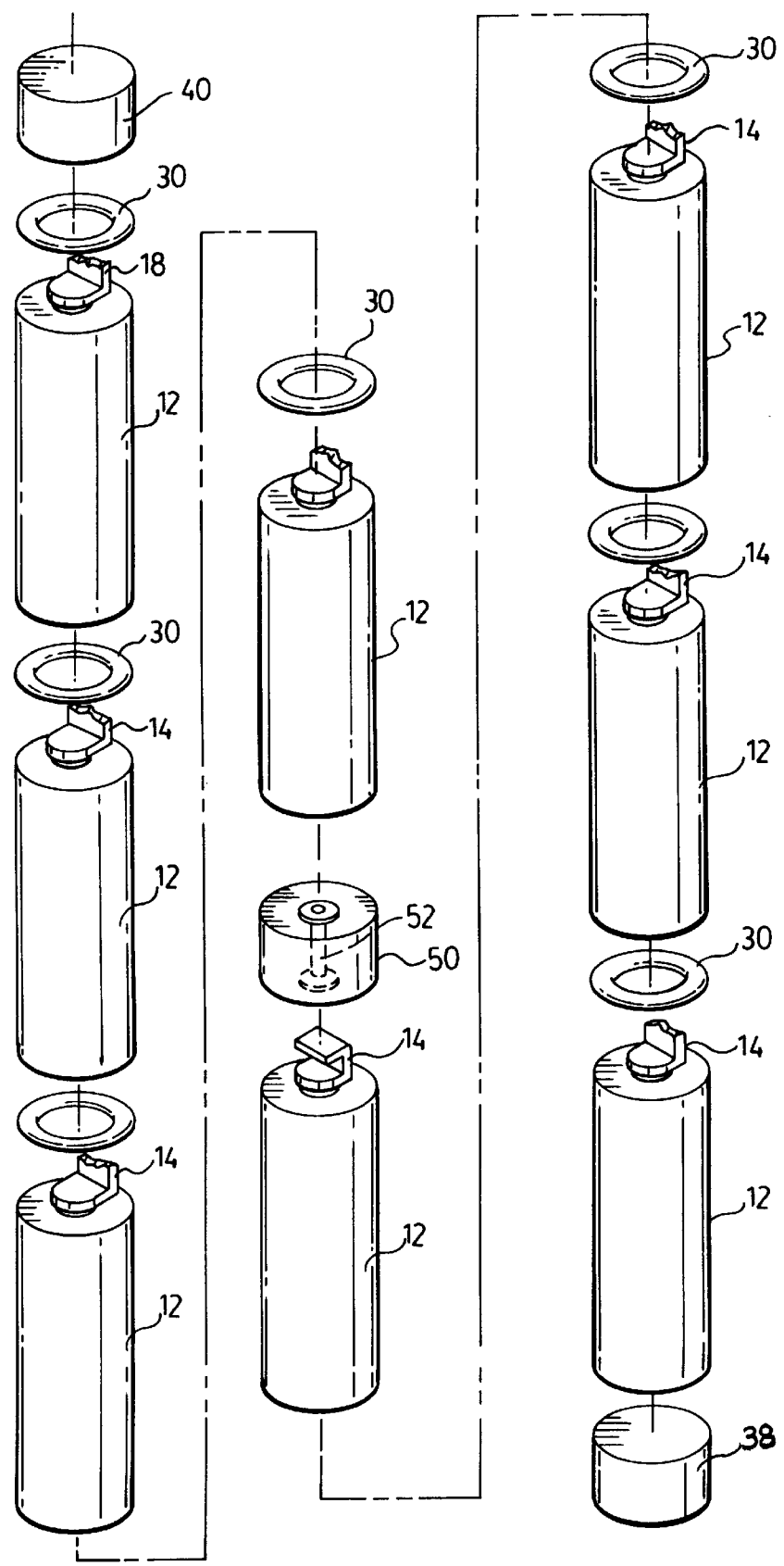
FIG. 4 is a representative perspective illustration of the arrangement of an eight cell pack.

FIG. 1 shows a battery pack 10 comprising a plurality of cells 12 in a stacked relationship which are serially connected by C shaped conductive straps 14. Top terminal 16 of the battery cells 12 is connected via strap conductor 18 to central pin 20 of top terminal 22, and lower terminal 24 is connected via strap 26 to the outer threaded ring 28 of terminal 22.

The interconnected cells 12 are separated by resilient washer rings 30 and in this instance a cylindrically shaped plug 50 having a connecting pin 52 is shown in the middle of the battery string. The entire battery string, plus conductors 18 and 26 are sandwiched between two elongated semi-cylindrical clam shells 32 and 34. Shells 32 and 34 comprise a pair of insulating members formed from a reinforced plastic insulating material preferably a polyester plastic material reinforced with glass fibers (which must be capable of providing continuous service whilst undergoing some distortion such as longitudinal bending without fracture or permanent distortion during a downhole operation).

Members 32 and 34 are provided with at least one longitudinal inner recess such as 36 to allow for the accommodation of strap conductors 26 therein in the final assembly of the battery pack.

The shells 32 and 34 are fastened to end plugs 38 and 40 by screws 42 to form a solid unit. Plug 50 may also be fastened to shells 38 and 40 by means of screws 42.

Finally, the assembled unit is inserted into a containment tube 44 which comprises a top member 46 and a lower portion 48. The portions 46 and 48 are sealed together by welding or threading as shown at 54 to ensure the integrity of the battery pack and seal the components against the unwanted ingress of substances from the surrounding medium and yet provide an element of flexibility for the battery pack. In this instance, components 46 and 48 have rolled lips 56 and 58 to secure the inner components in a working relationship. The sleeved components may be fitted to the interior components by means of a polymerizing resin to form a unitary structure if desired.

The battery pack of this invention is quite rugged and is easily manufactured. It provides accommodation for housing and supporting the individual energy cells in a confined containment which is rugged and yet flexible enough to travel around curves in a drilling pipe for direction drilling.

The recess provided in the inside surface of the clam shell for receiving and protecting the connecting conductor straps assures adequate support and positive location of the conducting straps 20 as to provide continuing operation of the battery pack, especially during periods where the pack is exposed to intense vibrations which can lead to fretting corrosion and the ultimate fracture of such conductors in prior art battery packs.

Those skilled in the art will immediately be aware of alternative constructions for this battery pack which may be applied to applicant's disclosed construction. Applicant prefers to limit the ambit of protection for this device as set out in the following claims.

What is claimed is:

1. A battery pack for powering electrical apparatus comprising:

a plurality of battery cells connected together in a predetermined manner and being stacked in an end to end relationship in said battery pack, said stacked battery cells being held in a secure relationship inside a pair of elongated semi-cylindrical shells which when taken together form a tight fitting internal cylindraceous cavity therein for said battery cells, one or both of said shells having a longitudinally extending recess formed in an interior surface therein, said shells being provided with suitable end closure means for securing said shells in a suitable working relationship and providing means for mounting end terminal means thereon, cover means for enclosing said assembled shells, end closure means and battery cells in a suitable enclosure to prevent the ingress of unwanted material into said battery pack.

2. A battery pack as claimed in claim 1 wherein said shells are comprised of a suitable glass fiber reinforced plastic material.

3. A battery pack as claimed in claim 1 wherein said end terminal means comprises a pair of coaxial members at one end of said pack.

4. A battery pack as claimed in claim 3 wherein one of said members of said pair is a pin and the other member is a cylinder.

5. A battery pack as claimed in claim 4 wherein a conductive strip is housed in said recess and connected to one end of a selected cell and the other end is connected to said other member.

6. A flexible battery pack having the exterior shape of a smooth cylinder comprising a plurality of preconnected cylindrical cells housed in an end to end stacked relationship inside a pair of resilient half shells of such shape as to form an internal cylindraceous cavity therebetween for tightly holding said cells in a predetermined orientation and relationship, cylindrical end closure means secured to said pair of assembled half shells for mounting a pair of coaxial terminal members thereon at one end thereof, cover means surrounding said shells and end closure means to seal said battery pack.

7. A battery pack as claimed in claim 6 wherein at least one of said pair of shells is provided with an internal groove which extends substantially the length of shell.

8. A battery pack as claimed in claim 7 wherein a conductor for said battery pack is received in said groove.

9. A battery pack as claimed in claim 8 wherein said shells are formed from a glass fiber containing plastic material.

10. A flexible battery pack as claimed in claim 6 wherein one of said members is a hollow cylinder attached to said cylindrical end closure means and having substantially the same diameter as said end closure means.

\* \* \* \* \*